United States Patent [19]
Suzuki et al.

[11] Patent Number: 4,767,571
[45] Date of Patent: Aug. 30, 1988

[54] INFRARED ABSORBENT

[75] Inventors: Yoshiaki Suzuki; Gouichi Hayashi, both of Minami-ashigara, Japan

[73] Assignee: Fuji Photo Film Co., Ltd., Kanagawa, Japan

[21] Appl. No.: 747,422

[22] Filed: Jun. 21, 1985

[30] Foreign Application Priority Data

| Jun. 27, 1984 | [JP] | Japan | 59-132495 |
| Jul. 24, 1984 | [JP] | Japan | 59-152045 |
| Aug. 4, 1984 | [JP] | Japan | 59-163980 |

[51] Int. Cl.$^4$ ............................................. F21V 9/04
[52] U.S. Cl. ..................................... 252/587; 556/20; 556/113; 556/136; 556/137; 556/150; 546/270; 502/400; 502/401; 430/616
[58] Field of Search ................ 556/20, 113, 136, 137, 556/150; 430/616; 502/400, 401; 252/587; 546/270

[56] References Cited

U.S. PATENT DOCUMENTS

| 2,651,648 | 9/1953 | Meyer | 556/113 |
| 2,738,364 | 3/1956 | Reppe et al. | 556/20 X |
| 2,842,578 | 7/1958 | Glassboro | 556/150 X |
| 3,035,089 | 5/1962 | Dunn | 556/150 X |
| 3,255,195 | 6/1966 | Benson | 556/20 X |
| 3,345,380 | 1/1975 | Hodgson | |
| 3,398,167 | 8/1968 | Mahler | 556/136 X |
| 3,494,899 | 2/1970 | Brown | |
| 3,505,372 | 4/1970 | Josh et al. | 556/137 X |
| 3,743,964 | 7/1973 | Drexhage et al. | |
| 3,806,462 | 4/1974 | Bloom | 556/150 X |
| 3,859,396 | 1/1975 | Oude Alink | |
| 3,875,199 | 4/1975 | Bloom | 556/136 |
| 4,050,938 | 9/1977 | Smith, Jr. et al. | |
| 4,062,867 | 12/1977 | Bloom | |
| 4,508,655 | 4/1985 | Sasagawa et al. | |

FOREIGN PATENT DOCUMENTS

| 20896 | 1/1981 | European Pat. Off. |
| 2456075 | 7/1975 | Fed. Rep. of Germany |
| 1442450 | 7/1966 | France |
| 2084997 | 12/1971 | France |
| 0224320 | 6/1984 | German Democratic Rep. |
| 5721458 | 2/1982 | Japan |

OTHER PUBLICATIONS

L. C. Isett et al., Properties of $NH_4Ni[S_2C_2(CN)]_2 \cdot H_2O$, vol. 22, No. 10, 11/15/80, pp. 4739–4743.
C. E. Forbes et al., Dithiotropolonates, II. The Synthesis and Properties of Dithiotropolonates and Its Metal (II) Complexes.
Umezawa et al., "Visible Light . . . ", J. Electrochem. Soc., Oct. 1982, pp. 2378–2380, McCleverty et al., "Transition Metal . . . ", J. of Amer. Chem. Soc., 11/22/67, pp. 6082–6092.

Primary Examiner—Patrick P. Garvin
Assistant Examiner—George R. Fourson
Attorney, Agent, or Firm—Birch, Stewart, Kolasch & Birch

[57] ABSTRACT

The present invention relates to an infrared absorbent comprising a metal complex. With the use of the infrared absorbent, there is provided an infrared absorbing material capable of absorbing near infrared light having a wavelength of 700–1500 nm or far infrared light with a high transmittance of visible light and a good fastness to heat and light. The infrared absorbent is suitable for various applications such as a safelight filter for infrared sensitive materials, control of growth of plants, cut-off of heat radiation, infrared cut filter harmful to tissues of human eyes, infrared cut filter for semiconductor light receiving elements or color solid image pick-up elements, and infrared cut filter for an optoelectronic integrated circuit wherein electrical and optical elements are incorporated in the same substrate.

30 Claims, 2 Drawing Sheets

INFRARED ABSORBENT

BACKGROUND OF THE INVENTION (1) Field of the Invention

This invention relates to a novel infrared absorbent for absorbing near infrared rays having a wavelength of 700–1500 nm or for absorbing far infrared rays which scarcely interfers with the transmission of visible light.

(2) Description of the Prior Art

Heretofore, various applications of an infrared absorbing material capable of selectively absorbing rays of far infrared light or near infrared light having a wavelength of 700–1500 nm have been proposed. The following is five examples of conventional primary applications of the infrared absorbing material.

(1) Safelight filter for infrared-sensitive materials:

Recently, there have been developed many silver halide light sensitive materials (which will be hereinafter referred to as "light sensitive materials") which are sensitive to rays of a far infrared light or a near infrared light having a wavelength of 700 nm or more. That is, light sensitive materials are made to have an infrared sensitivity irrespective of distinction of black and white photographs or color photographs including a normal-type, instant-type and thermal developed-type photographs, so as to be useful for an artificial color photograph for resource search or to be exposable with a light emission diode capable of emitting a light in an infrared area.

Conventionally, a safelight filter for a panchromatic photosensitive material has been used as such infrared-sensitive materials.

(2) Control of growth of plants:

It has been long known that a so-called morphogenesis with regard to growth and differentiation of plants such as germination of seed, extension of stem, development of leaf, budding of flower and formation of tuber is influenced by a light, and it has been studied as a photomorphogenesis. It is also known that a red light having a wavelength of about 660 nm and a red light light having a wavelength of about 720–730 nm antagonistically function to each other, and therefore time of flowering or earing, extent of growth or yield of fruits can be varied by changing a proportion of both the lights. Such a study has been made by controlling a spectral energy distribution of a light with use of a light source lamp and a filter in combination. Therefore, it was difficult to carry out a test in a large-scale green house or farm.

If a plastic film capable of selectively absorbing rays having a wavelength of 700 nm or more is obtainable, it will be possible to control a spectral energy distribution of a light to adapt the above-mentioned principle to an actual productive site, thereby providing great progress and profit to an engineering agriculture. For example, it is expected that earing time may be delayed or growth may be controlled by covering plants with a near-infrared absorbing film at a specific time to cut-off a light having a wavelength of 700 nm or more. (See "Chemical Control of Plants", Katsumi Ineda, Vol. 6, No. 1 (1971))

(3) Cut-off of heat radiation:

Among solar radient energy rays of a near infrared and an infrared area having a wavelength of 800 nm or more is absorbed by an object and converted to a thermal energy. In addition, a large part of its energy distribution is converged at a near infrared area having a wavelength of 800–2000 nm. Accordingly, a film capable of selectively absorbing rays of a near infrared light is remarkably effective for cut-off of a solar energy, and it is possible to suppress an increase in temperature in a room admitting a visible light. Such a film may be adapted to a window of a house, office, store, automobile and airplane, etc. as well as a gardening green house. In particular, as to the green house, temperature control is very important. For instance, if the temperature is excessively elevated, plants will be greatly damaged which will result in the plant withering. Accordingly, when the near infrared absorbing film is used, the temperature control may be rendered easy, and a new technique such as a retarded cultivation in the summer may be developed. A conventional heat radiation cutting-off material includes a thin metallic layer deposited on a surface of a plastic film or on an inorganic compound, e.g., FeO dispersed in a glass.

(4) Cut filter of infrared rays harmful to tissues of human eyes:

Infrared rays contained in a sun light or in a light radiated in welding have a harmful influence to tissues of human eyes. One of the primary applications of the infrared cut filter is an application to spectacles for protecting the human eyes from rays of light containing such harmful infrared rays, e.g., sunglasses and protecting glasses for welding.

(5) Infrared cut filter for semiconductor light receiving element:

In another field where development of this kind of infrared absorbing plastics is most intensively desired, the infrared absorbing plastics are adapted to an infrared cut filter for a photosensor to make the spectral sensitivity of a semiconductor light receiving element such as silicon photo diode (which will be hereinafter referred to as SPD) approach to a relative spectral sensitivity curve.

Presently, SPD is mainly used as a light receiving element of a photosensor used in an automatic exposure meter for a camera or the like. FIG. 2 shows a graph of the relative spectral sensitivity curve and that of a relative value of an output of SPD to each wavelength.

In order to use a SPD for an exposure meter, it is required to cut-off light in an infrared area which is not sensitive to human eyes and it is also required to make the spectral sensitivity curve of SPD shown in FIG. 2 approach the relative spectral sensitivity curve. Particularly, as an output of SPD is large to the light having a wavelength of 700–1100 nm, and the eyes are insensitive to such a light, this is one of factors of malfunction of the exposure meter. Therefore, if it is possible to use an infrared absorbing plastic film suppressing an absorption of a visible light area, while permitting an absorption of an infrared light area in the entire range of 700–1100 nm, light transmittance in a visible area may be increased and an output of SPD may be also increased. Thus, it will be possible to apparently remarkably improve a performance of the exposure meter.

Conventionally, this kind of photosensor has been practically used by mounting an infrared cut filter made of glass containing an inorganic infrared absorbent to a front surface of SPD.

Further, there has been proposed a near-infrared absorbing plastic film as a SPD filter material containing an infrared absorbent of a complex containing quaternary ammonium group. (Japanese Patent Application (OPI) No. 21458/82)

However, in general organic dyestuff infrared absorbents in the prior art are unsatisfactory in practical use because of their low light fastness and heat fastness.

Further, regarding the above-mentioned applications, filter materials as used have the following shortcomings.

The safelight filter for the panchromatic photosensitive material in the afore-mentioned applications (1) permits a green light having a high luminosity factor to be partially transmitted, and also permits a large quantity of infrared light to be transmitted to cause fogging. For this reason, such a safelight filter has not been able to achieve its object for infrared sensitive materials.

In the applications (3), the metallic layer deposited plastic film or the FeO dispersed glass functions to intensively absorb not only infrared light but also visible light to cause reduction in inside luminance. For this reason, such a plastic film or glass is not suitable for agricultural uses because of lack of an absolute quantity of sunshine. Especially, the filter material for growth control of plants in the applications (2) is required to selectively absorb a light having a wavelength of 700–750 nm, and therefore the metallic layer deposited film is quite unsuitable for such an object.

Furthermore, in the applications (5), the infrared cut filter using the infrared absorbent containing an inorganic substance is relatively fast to heat and light, but light transmittance in a visible area is low. To cope with this, a sensitivity of SPD was intended to be increased. However, an increase in the sensitivity of SPD results in an increase in leak current to cause a malfunction of the photosensor, resulting in a big problem in reliability. Additionally, since the infrared cut filter contains an inorganic substance, there is a lack in flexibility in production of a photosensor and a difficulty in improving a production process. Further, the infrared cut filter containing an inorganic substance causes a high production cost which results in a great increase in the cost of the photosensor.

In this manner, although the photosensor using the conventional cut filter containing an inorganic substance has a spectral sensitivity similar to spectral luminous efficiency curve, it has remarkable defects in such as a reduction in the operational performance, an increase in the production cost and a difficulty in improving the production process.

Moreover, in the applications (5), the conventional near-infrared absorbing plastic film containing the infrared absorbent of a complex containing quaternary ammonium group does not have a sufficient solubility for the infrared absorbent in an organic solvent, which was a restriction in preparing a thin plastic film layer.

In other words, the SPD filter as mentioned above is desired to have a very small thickness and a good absorption efficiency of infrared rays. To this end, it is necessary to disperse a large quantity of infrared absorbent in resin. Therefore, the infrared absorbent having a small solubility in an organic solvent has not met the above requirements.

Further, the conventional near-infrared absorbing plastic film containing the infrared absorbent of a complex containing quaternary ammonium group is desired to be improved in its heat fastness and light fastness.

SUMMARY OF THE INVENTION

Accordingly, it is an object of the present invention to provide a near-infrared absorbent which has a high solubility in an organic solvent and a good compatibility with a film forming binder.

It is another object of the present invention to provide an infrared absorbent which may be included in an infrared absorbent material (e.g., optical filter) which has a high cut-off ability against near-infrared rays per unit thickness, a high transmittance of visible light, and a good fastness to heat and light.

It is another object of the present invention to provide an infrared absorbent of a metal complex which may be adjusted in solubility by properly combining cations relative to a metal complex ion, and accordingly may be widely used in combination with various binders.

It is a further object of the present invention to provide an infrared absorbent which may be included in an infrared absorbing material having an absorption maximum in a large wavelength, especially, a wavelength of 900 nm or more.

It is a further object of the present invention to provide an infrared absorbent which is stable to chemicals, especially, acids.

It is still a further object of the present invention to provide an infrared absorbent which can be employed for various applications including the aforementioned applications, that is, as a safelight filter for infrared sensitive materials, control the growth of plants, cut-off of heat radiation, infrared cut filter harmful to tissues of human eyes, infrared cut filter for semiconductor light receiving elements or color solid image pick-up elements, and infrared cut filter for an optoelectronic integrated circuit wherein electrical and optical elements are incorporated in the same substrate.

Other and further objects, features and advantages of the invention will appear more fully from the following description taken in connection with the accompanying drawings.

DETAILED DESCRIPTION OF THE INVENTION

Figure 1:
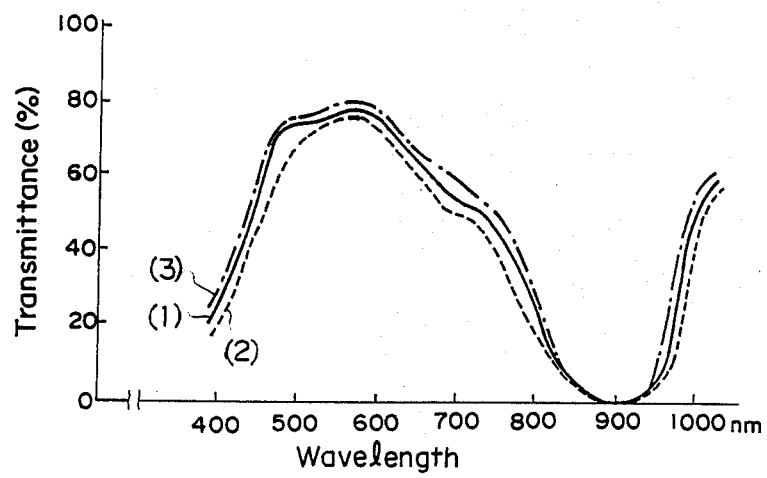
FIG. 1 is a graph of spectral transmittance curves of the optical filter obtained in Example 1.
Figure 2:
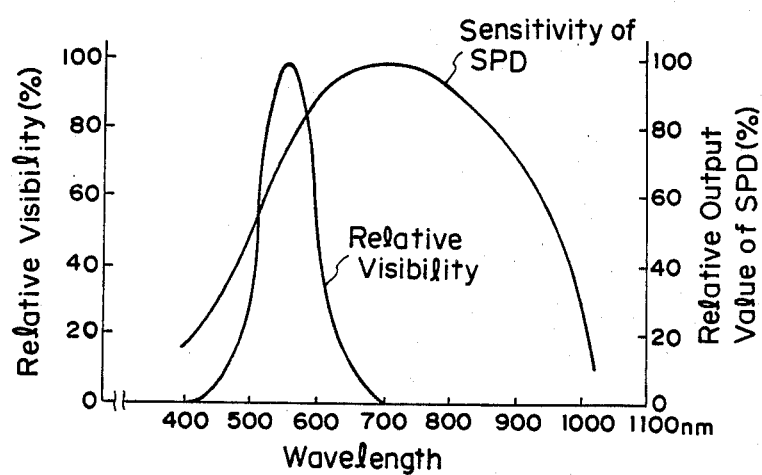
FIG. 2 is a graph of relative sensitivity curves of human eyes and SPD with respect to the wavelength of light.

The present invention provides an infrared absorbent comprising at least one of compounds represented by the following general formula [I]

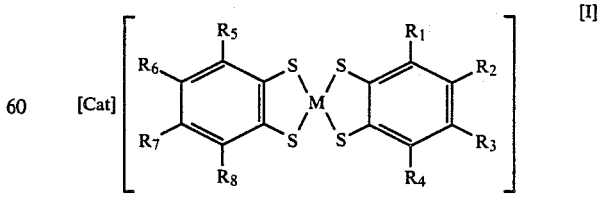

wherein M represents copper, cobalt, nickel, palladium or platinum; Cat represents a cation neutralizing the complex; $R_1$ to $R_8$ each independently represents a hydrogen atom, amino group, halogen atom, cyano group or hydroxyl group, or alkyl, aryl or heterocyclic group which may be bonded through a divalent connecting group to a benzene ring and may be the same or different, with the proviso that at least one of $R_1$ to $R_8$ is an electron donating group when Cat represents a cation other than a quaternary phosphonium or iminium cation.

Further, the present invention provides an infrared absorbent composition and material comprising at least one of compounds represented by general formula [I].

Examples of a monovalent cation as represented by Cat in the compounds of general formula [I] may include alkali metals (e.g., $Li^+$, $Na^+$ and $K^+$), inorganic monovalent cations such as $NH_4^+$ or onium ions (e.g., a quaternary ammonium ion, quaternary phosphonium ion and iminium ion).

In the above-mentioned onium ions, it is preferred to employ such ions as represented by the following general formulae of (I-a), (I-b), (I-c) or (I-d):

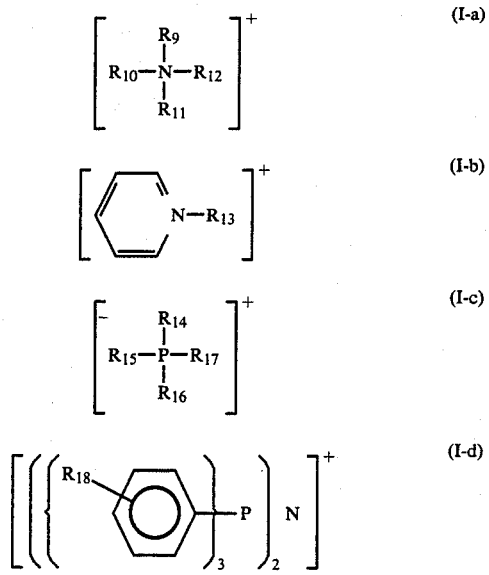

wherein, $R_9$ to $R_{18}$ each independently represents a substituted or unsubstituted alkyl group containing 1 to 20 carbon atoms, or a substituted or unsubstituted aryl group containing 6 to 14 carbon atoms. Examples of the substituted or unsubstituted alkyl group containing 1 to 20 carbon atoms may include a methyl, ethyl, n-butyl, iso-amyl, n-dodecyl and n-octadecyl group. Examples of the aryl group containing 6 to 14 carbon atoms may include a phenyl, tolyl and α-naphtyl group. $R_{18}$ may be a hydrogen atom.

Examples of a substituent which may be introduced in the alkyl or aryl group may include a cyano group, an alkyl group containing 1 to 20 carbon atoms (e.g., a methyl, ethyl, n-butyl and n-octyl group), an aryl group containing 6 to 14 carbon atoms (e.g., a phenyl, tolyl and α-naphtyl group), an acyloxy group containing 2 to 12 carbon atoms (e.g., an acetoxy, benzoyl and p-methoxybenzoyloxy group), an alkoxy group containing 1 to 6 carbon atoms (e.g., a methoxy, ethoxy, propoxy and butoxy group), an aryloxy group (e.g., a phenoxy and tolyloxy group), an aralkyl group (e.g., a benzyl, phenethyl and anisyl group), an alkoxycarbonyl group (e.g., a methoxycarbonyl, ethoxycarbonyl and n-butoxycarbonyl group), an aryloxycarbonyl group (e.g., a phenoxycarbonyl and tolyloxycarbonyl group), an acyl group (e.g., an acetyl and benzoyl group), an acylamino group (e.g., an acetylamino and benzoylamino group), a carbamoyl group (e.g., a N-ethylcarbamoyl and N-phenylcarbamoyl group), an alkylsulfonylamino group (e.g., a methylsulfonylamino and phenylsulfonylamino group), a sulfamoyl group (e.g., a N-ethylsulfamoyl and N-phenylsulfamoyl group), and a sulfonyl group (e.g., a mesyl and tosyl group).

Examples of the halogen atoms represented by $R_1$ to $R_8$ in the compounds of general formula [I] may include a fluorine, chlorine, bromine and iodine atom.

The alkyl group as represented by $R_1$ to $R_8$ is preferably an alkyl group containing 1 to 20 carbon atoms which may be a straight or branched chain alkyl group. Typical examples of the alkyl group may include a methyl, ethyl, propyl, butyl, hexyl, octyl, decyl, dodecyl, hexadecyl and octadecyl group. The aryl group as represented by $R_1$ to $R_8$ is preferably an aryl group containing 6 to 14 carbon atoms. Typical examples of the aryl group may include a phenyl and a naphthyl group. The heterocyclic group as represented by $R_1$ to $R_8$ is preferably a 5-membered or 6-membered ring containing at least one nitrogen, oxygen or sulphur atoms as a hetero atom therein. Typical examples of the heterocyclic group may include a furyl, hydrofuryl, thienyl, pyrrolyl, pyrrolidyl, pyridyl, imidazolyl, pyrazolyl, quinolyl, indolyl, oxazolyl and thiazolyl group. These alkyl, aryl and heterocyclic groups may be further substituted.

The above-mentioned alkyl, aryl and heterocyclic group as represented by $R_1$ to $R_8$ may be bonded to carbon atoms of the benzene ring via the divalent connecting group such as an oxy (—O—), thio (—S—), amino, oxycarbonyl, carbonyl, carbamoyl, sulfamoyl, carbonylamino, sulfonyl or carbonyloxy group.

Examples of groups represented by $R_1$ to $R_8$ wherein an alkyl group is bonded through the divalent connecting group to the carbon atom in the benzene ring may include an alkoxy group (e.g., a methoxy, ethoxy, propoxy, butoxy, n-decyloxy, n-dodecyloxy or n-hexadecyloxy group), an alkoxycarbonyl group (e.g., a methoxycarbonyl, ethoxycarbonyl, butoxycarbonyl, n-decyloxycarbonyl or n-hexadecyloxycarbonyl group), an acyl group (e.g., an acetyl, valeryl, stearoyl, benzoyl or toluoyl group), an acyloxy group (e.g., an acetoxy or hexadecylcarbonyloxy group), an alkylamino group (e.g., a N-methylamino, N-ethylamino, N,N-dimethylamino or N,N-dibutylamino group), an alkylcarbamoyl group (e.g., a butylcarbamoyl, N,N-diethylcarbamoyl or n-dodecylcarbamoyl group), an alkylsulfamoyl group (e.g., a butylsulfamoyl, N,N-diethylsulfamoyl or n-dodecylsulfamoyl group), a sulfonylamino group (e.g., a methylsulfonylamino or butylsulfonylamino group), a sulfonyl group (e.g., a mesyl or ethanesulfonyl group), or an acylamino group (e.g., an acetylamino, valerylamino, palmitoylamino, benzoylamino or toluoylamino group).

Examples of groups represented by $R_1$ to $R_8$ wherein an aryl group is bonded through the divalent connecting group to the carbon atom in the benzene ring may include an aryloxy group (e.g., a phenoxy or naphtoxy group), an aryloxycarbonyl group (e.g., a phenoxycarbonyl or naphtoxycarbonyl group), an acyl group (e.g., a benzoyl or naphtoyl group), an anilino group (e.g., a phenylamino, N-methylanilino or N-acetylanilino group), an acyloxy group (e.g., a benzoyloxy or toluoyloxy group), an arylcarbamoyl group (e.g., a phenylcarbamoyl group), an arylsulfamoyl group (e.g., a phenylsulfamoyl group), an arylsulfonylamino group (e.g., a phenylsulfonylamino, p-tolylsulfonylamino group), an arylsulfonyl group (e.g., a benzenesulfonyl or tosyl group), or an acylamino group (e.g., benzoylamino group).

The above-mentioned alkyl, aryl and heterocyclic group as represented by $R_1$ to $R_8$ may further be substituted by a halogen atom (e.g., a fluorine, chlorine, bromine or iodine atom), a cyano group, a hydroxyl group, a straight or branched chain alkyl group (e.g., a methyl, ethyl, propyl, butyl, hexyl, octyl, decyl, dodecyl, tetradecyl, hexadecyl, heptadecyl, octadecyl or methoxyethoxyethyl group), an aryl group (e.g., a phenyl, tolyl, naphtyl, chlorophenyl, methoxyphenyl or acetylphenyl group), an alkoxy group (e.g., a methoxy, ethoxy, butoxy, propoxy or methoxyethoxy group), an aryloxy group (e.g., a phenoxy, tolyoxy, naphtoxy or methoxyphenoxy group), an alkoxycarbonyl group (e.g., a methoxycarbonyl, butoxycarbonyl or phenoxycarbonyl group), an aryloxycarbonyl group (e.g., a phenoxycarbonyl, tolyoxycarbonyl or methoxyphenoxy carbonyl group), an acyl group (e.g., a formyl, acetyl, valeryl, stearoyl, benzoyl, toluoyl, naphtoyl or p-methoxybenzoyl group), an acyloxy group (e.g., an acetoxy or acyloxy group), an acylamino group (e.g., an acetamido, benzamido or methoxyacetamido group), an anilino group (e.g., a phenylamino, N-methylanilino, N-phenylanilino or N-acetylanilino group), an alkylamino group (e.g., a n-butylamino, N,N-diethylamino, 4-methoxy-n-butylamino group), a carbamoyl group (e.g., n-butylcarbamoyl, N,N-diethylcarbamoyl group), a sulfamoyl group (e.g., a n-butylsulfamoyl, N,N-diethylsulfamoyl, n-dodecylsulfamoyl or N-(4-methoxy-n-butylsulfamoyl group), a sulfonylamino group (e.g., a methylsulfonylamino, phenylsulfonylamino or methoxymethylsulfonylamino group), or a sulfonyl group (e.g., a mesyl, tosyl or methoxymethanesulfonyl group).

In the compounds as represented by the aforementioned general formula [I], when Cat is a phosphonium or iminium cation, at least one selected from the group consisting of $R_1$ to $R_8$ is not necessarily an electron donating group, but when Cat is any cation other than a phosphonium or iminium cation, at least one of $R_1$ to $R_8$ is required to be an electron donating group, and more preferably be an electron donating group having a negative sigma value in Hammet's rule and having an absolute value of the sigma value of 0.20 or more. The electron donating group has an effect of shifting an absorption maximum to a larger wavelength side, and the electron donating group having an absolute value of 0.20 or more is preferable with regard to shifting the absorption maximum to a wavelength of 900 nm or more. Preferable examples of the electron donating group may include (1) an alkoxy group containing 1 to 20 carbon atoms (which may be a straight or branched chain alkoxy group, and may have substituents thereon), (2) a substituted or unsubstituted aryloxy group containing 6 to 14 carbon atoms, or (3) a substituted or unsubstituted amino group.

In detail, examples of the substituted or unsubstituted alkoxy group containing 1 to 20 carbon atoms of (1) may include a methoxy, ethoxy, propoxy, iso-propoxy, n-butoxy, n-pentyloxy, n-hexyloxy, n-dodecyloxy, or n-hexadecyloxy group. Examples of the substituted or unsubstituted aryloxy group containing 6 to 14 carbon atoms of (2) may include a phenoxy or naphtyloxy group. Examples of the substituted or unsubstituted amino group of (3) may include an amino, N-methylamino, N-ethylamino, N-propylamino, N-butylamino, N,N-dimethylamino, N,N-diethylamino, or N,N-dibutylamino group.

Typical examples of these electron donating groups which have the following sigma values, which have been cited from Hansch, C., Leo, A., Unger, S. H., Kim, K. -H., Nikaitani, D., Lien, E. J. "J. Med. Chem.," 16, 1207 (1973) Hansch, C., Rockwell, S. D., Jow, P. Y. C., Leo, A., Steller, E. E.; ibid, 20, 304 (1977).

TABLE 1'

| Substituent | σ |
|---|---|
| —OH | −0.37 |
| —OCH$_3$ | −0.27 |
| —OC$_2$H$_5$ | −0.24 |
| —OC$_3$H$_7$ | −0.25 |
| —OC$_4$H$_9$ | −0.32 |
| —OC$_5$H$_{11}$ | −0.34 |
| —NH$_2$ | −0.66 |
| —NHCH$_3$ | −0.84 |
| —N(CH$_3$)$_2$ | −0.83 |
| —OC$_6$H$_5$ | −0.32 |

In the compounds represented by the aforementioned general formula [I], a desirable infrared absorbent may be obtained by selecting a combination of cations in Cat, metals in the complex, and substituents in the benzene nucleus. With respect to Cat, a phosphonium cation compound tends to have a higher solubility to an organic solvent than an ammonium cation compound.

With respect to the metals, a complex having nickel, palladium or platinum has a higher effect for shifting an absorption maximum to a larger wavelength side than that having copper or cobalt.

Further, it is preferable to employ an electron donating group as $R_1$ to $R_8$. However, the compound containing a substituted or unsubstituted amino group as the electron donating group occasionally becomes unstable to chemicals, particularly, acidic substances.

One of more preferable compounds in general formula [I] is a compound containing a quaternary phosphonium group (general formula (I-a)) as Cat (This compound will be hereinafter referred to as a compound of group (i)), and a hydrogen atom, halogen atom or substituted or unsubstituted alkyl group as $R_1$ to $R_8$. Examples of such a compound as above mentioned may include the following compounds. It is noted that the present invention is not limited to these exemplified compounds. In the following formulae, $^nC_xH_{2x+1}$ means a straight chain alkyl group containing x carbon atoms.

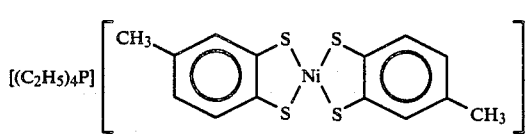

(1)

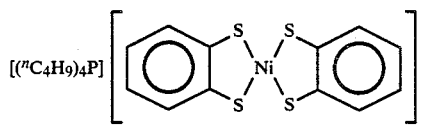

(2)

-continued
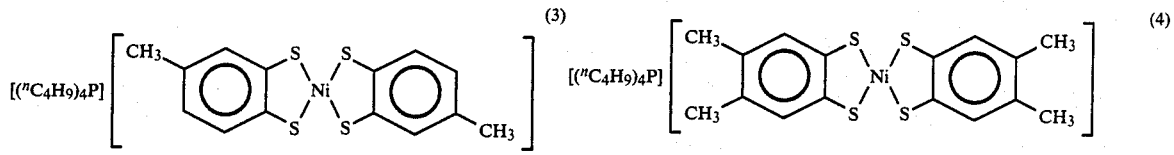
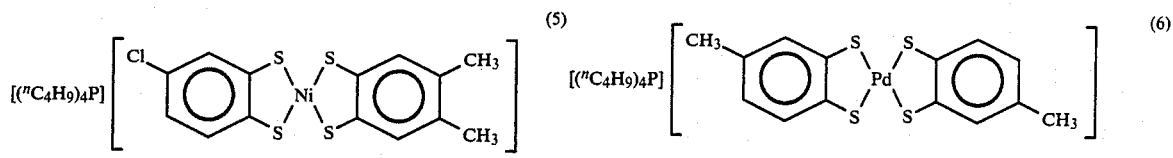
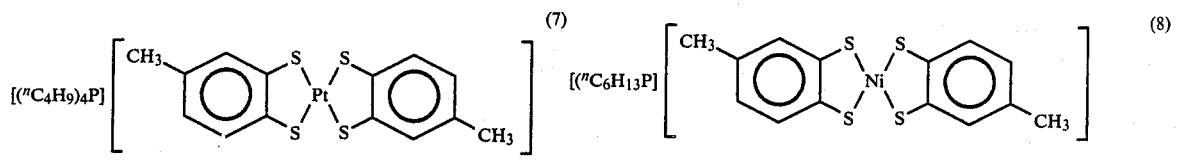
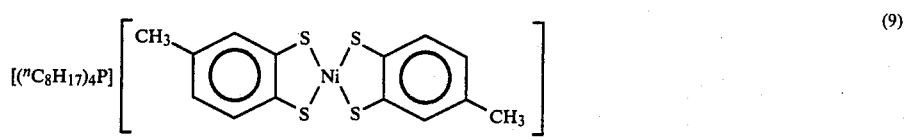
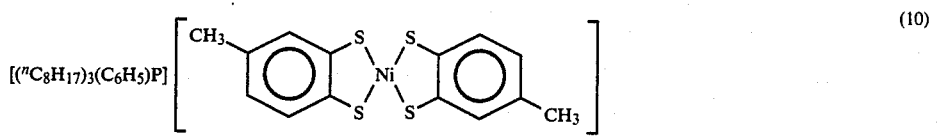
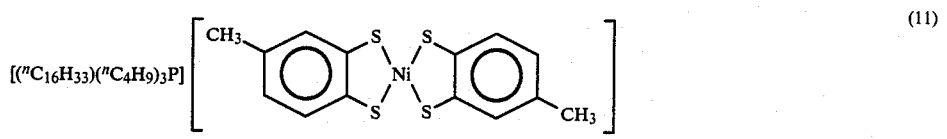
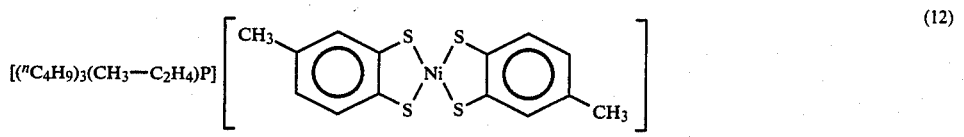
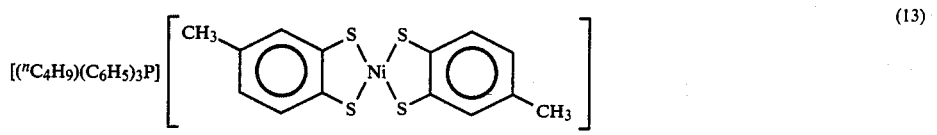
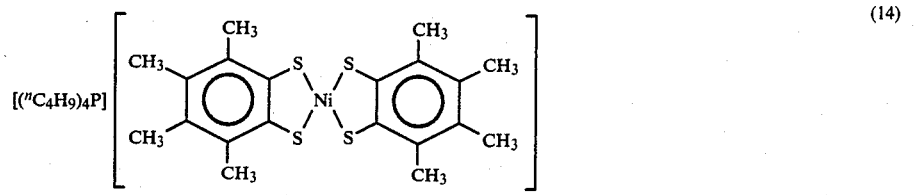
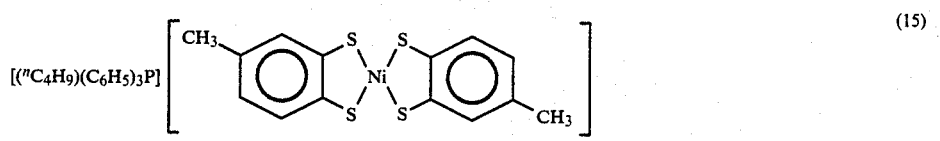

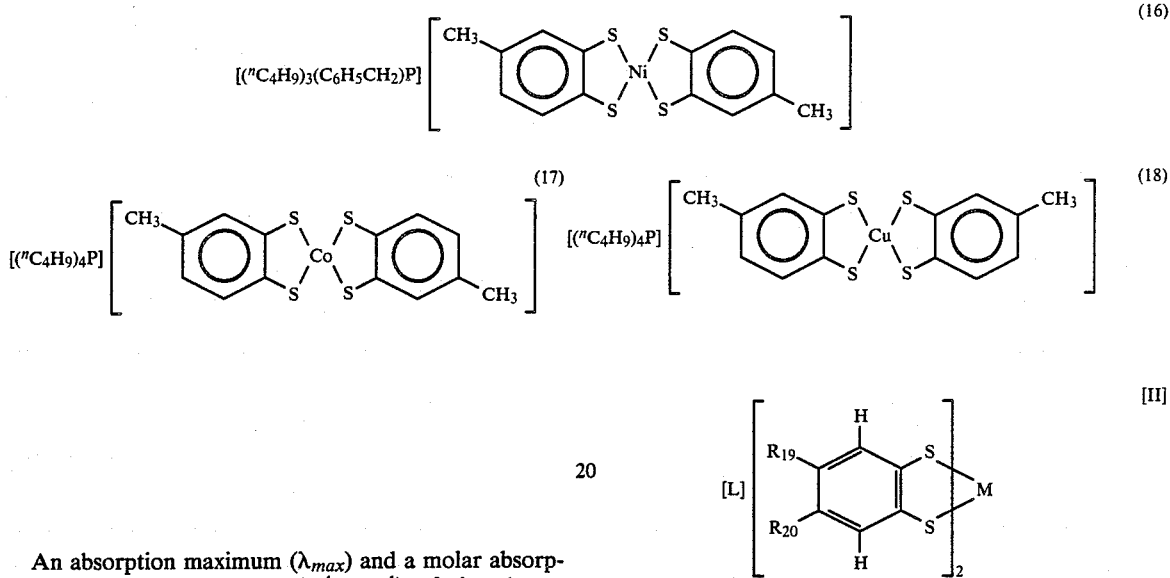

An absorption maximum ($\lambda_{max}$) and a molar absorption coefficient ($\epsilon_{max}$; $l \cdot mol^{-1} \cdot cm^{-1}$) of the above-mentioned compounds are as follows:

TABLE 2

| Exemplified Compound | $\lambda_{max}$ (nm) | $\epsilon_{max}$ ($\times 10^4$) |
|---|---|---|
| | | (In dichloromethane) |
| (1) | 908 | 1.36 |
| (2) | 902 | 1.38 |
| (3) | 910 | 1.38 |
| (4) | 913 | 1.38 |
| (5) | 895 | 1.30 |
| (6) | 880 | 1.41 |
| (7) | 806 | 1.42 |
| (8) | 911 | 1.38 |
| (9) | 910 | 1.36 |
| (10) | 906 | 1.36 |
| (11) | 910 | 1.38 |
| (12) | 909 | 1.38 |
| (13) | 911 | 1.37 |
| (14) | 918 | 1.38 |
| (15) | 909 | 1.36 |
| (16) | 910 | 1.36 |
| (17) | 724 | 1.36 |
| (18) | 706 | 1.38 |

Another preferred compound of the compounds represented by general formula [I] is a compound containing the aforementioned electron donating group as at least one of $R_1$ to $R_8$ (This compound will be hereinafter referred to as a compound of group (ii)). When using such a compound, the infrared absorbent of the present invention may absorb rays of light having a wavelength of about 900 nm or more with scarcely interferes which the transmission of visible light.

In the compounds of group (ii), a compound containing Ni as M is preferable with regard to shifting of an absorption maximum of the infrared absorbent to a longer wavelength side. In the case that M is Cu or Co, an absorption maximum wavelength tends to be rendered slightly smaller than the case of Ni. Further, in the case that M is Pd or Pt, an absorption maximum wavelength is similar to that in case of Cu or Co, but, a compound employing Pd or Pt is expensive in its raw materials for production.

A preferable compound of the compounds of group (ii) is represented by the following general formual [II]:

wherein, M stands for the same metal as in the aforementioned general formula [I], and L stands for the same cation as Cat in the general formula [I]. L is preferably a lithium, sodium or potassium ion, a tetraalkylammonium, tetraalkylphosphonium or bis(triphenyl phosphine) iminium ion containing totally 4 to 72 carbon atoms in an alkyl moiety, or an N-alkylpyridinium ion containing 1 to 18 carbon atoms in an alkyl moiety.

$R_{19}$ and $R_{20}$ stand for a hydrogen atom, amino group, halogen atom, cyano group or hydroxyl group, or alkyl or aryl group which may be bonded through a divalent connecting group to a benzene ring. These groups may be the same or different, and at least one of these groups has a sigma value in Hammet's rule which is negative and having an absolute value of 0.20 or more.

Especially preferable examples of the complex as represented by the general formula [II] may be such that M is Cu, Co or Ni, and L is tetraalkylammonium ion containing a total of 17 and more carbon atoms in an alkyl moiety, N-alkylpyridinium ion containing 1 to 18 carbon atoms in an alkyl moiety, tetraalkylphosphonium or bis(triphenylphosphonium) iminium ion containing a total of 4 to 72 carbon atoms in an alkyl moiety, and at least one of $R_{19}$ and $R_{20}$ which is a hydroxyl, substituted or unsubstituted alkoxy, substituted or unsubstituted aryloxy, or substituted or unsubstituted amino group.

The compounds of group (ii) of the present invention are synthesized by reacting an o-dibromobenzene derivative with a mercapto copper (I) compound, decomposing an o-bis(alkylthio) benzene derivative as obtained with sodium in liquid ammonia, adding nickel chloride to an o-dimercapto benzene derivative as obtained, and then adding a salt of a suitable cation thereto.

Such a synthesis as above may be practised referring to the synthetic process as described in JACS 81 4927 (1959), ibid 87 1483 (1965) and ibid 88 43 (1966).

Examples of the compounds represented by the afore-mentioned general formula [II] are shown in the following Table, in which exemplified examples effective for preferred embodiments of the invention are shown, and it is noted that the invention is not limited to these exemplified compounds.

TABLE 3

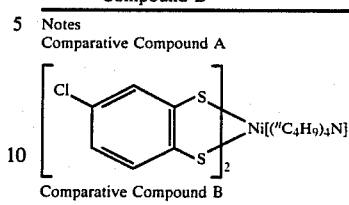

| Exemplified Compound No. | L | $R_{19}$ | $R_{20}$ | M |
|---|---|---|---|---|
| (19) | $(^nC_4H_9)_4N$ | $CH_3O-$ | H | Ni |
| (20) | " | $C_2H_5O-$ | " | " |
| (21) | " | $^nC_3H_7O-$ | " | " |
| (22) | " | $^iC_3H_7O-$ | " | " |
| (23) | " | $^nC_4H_9O-$ | " | " |
| (24) | " | $^nC_5H_{11}O-$ | " | " |
| (25) | " | $^nC_6H_{13}O-$ | " | " |
| (26) | " | $^nC_{12}H_{25}O-$ | " | " |
| (27) | " | $^nC_{16}H_{33}O-$ | " | " |
| (28) | $(^nC_4H_9)_4P$ | $CH_3O-$ | " | " |
| (29) | " | $C_2H_5O-$ | " | " |
| (30) | " | $^nC_3H_7O-$ | " | " |
| (31) | " | $^iC_3H_7O-$ | " | " |
| (32) | " | $^nC_4H_9O-$ | " | " |
| (33) | " | $^nC_5H_{11}O-$ | " | " |
| (34) | " | $^nC_6H_{13}O-$ | " | " |
| (35) | " | $^nC_{12}H_{25}O-$ | " | " |
| (36) | " | $^nC_{16}H_{33}O-$ | " | " |
| (37) | " | $HO-$ | " | " |
| (38) | $^nC_{16}H_{33}(CH_3)_3N$ | $C_2H_5O-$ | " | " |
| (39) | 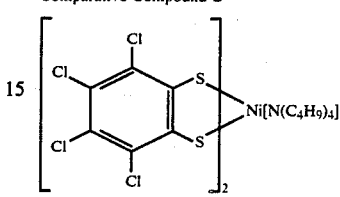 | " | " | " |
| (40) | $(^nC_4H_9)_4N$ | $H_2N-$ | " | " |
| (41) | $(^nC_4H_9)_4P$ | " | " | " |
| (42) | $^nC_{16}H_{33}(^nC_4H_9)_3P$ | $C_2H_5O-$ | " | " |
| (43) | $(^nC_4H_9)_4P$ | $H_2N-$ | " | " |
| (44) | " | $(CH_3)HN-$ | " | " |
| (45) | " | $(CH_3)_2N-$ | $(CH_3)_2N-$ | " |
| (46) | " | $C_2H_5O-$ | H | Cu |
| (47) | " | " | " | Co |
| (48) | " | " | " | Pd |
| (49) | " | " | " | Pt |
| (50) | $[(C_6H_5)_3P]_2N$ | " | " | Ni |
| (51) | $[(CH_3C_6H_4)_3P]_2N$ | " | " | " |

An absorption maximum ($\lambda_{max}$; mm) and a molar absorption coefficient ($\epsilon_{max}$; $1 \cdot mol^{-1} \cdot cm^{-1}$) of these compounds in Table 3 in dichloromethane are shown in Table 4 below.

TABLE 4

| Compound No. | $\lambda_{max}$ | $\epsilon_{max} \times 10^{-4}$ |
|---|---|---|
| (20) | 948 nm | 1.61 |
| (43) | 1053 | 1.53 |
| (44) | 987 | 1.73 |
| (45) | 1165 | 4.70 |
| Comparative Compound A | 895 | 1.40 |
| Comparative Compound B | 885 | — |

Notes
Comparative Compound A

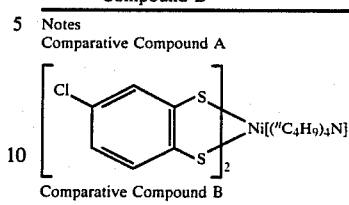

Comparative Compound B

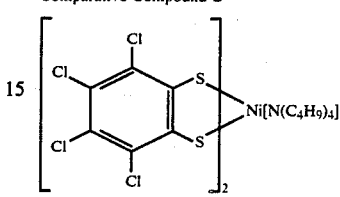

In the compounds of group (ii), certain types of cations of Cat greatly contribute to the solubility of the complex to an organic solvent, and generally a quaternary phosphonium group provides a higher solubility than a quaternary ammonium group. Further, the quaternary ammonium group containing a total of 17 or more carbon atoms provides a higher solubility than that containing 17 or less carbon atoms.

More preferable compounds which are represented by the afore-mentioned general formula [I] include compounds containing an iminium cation represented by the afore-mentioned general formula (I-d) as Cat (These compounds will be hereinafter referred to as compounds of group (iii)). $R_1$ to $R_8$ in the compounds of group (iii) each represents more preferably a hydrogen atom, halogen atom, cyano group, or substituted or unsubstituted alkyl group, and most preferably, a hydrogen atom, methyl group, or chlorine or bromine atom. While M is suitably selected considering an absorption wavelength and a raw material cost, nickel, copper and cobalt are preferable because palladium and platinum are expensive. When M is cobalt or copper, an absorption maximum wavelength is shifted to a shorter wavelength side than that with use of the other metals.

Preferable compounds of group (iii) are exemplified as follows; however, it is noted that the present invention is not limited to these exemplified compounds.

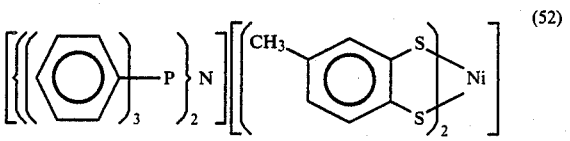

(52)

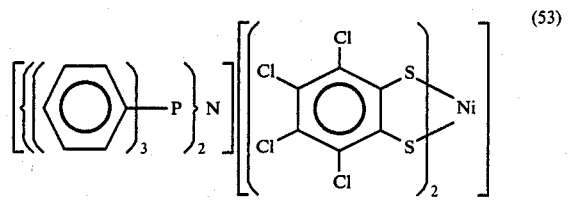

(53)

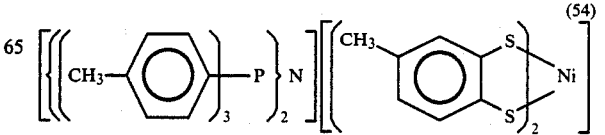

(54)

-continued

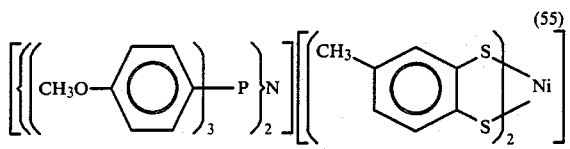

An absorption maximum ($\lambda_{max}$) and a molar absorption coefficient ($\epsilon_{max}$; $1 \cdot mol^{-1} \cdot cm^{-1}$) of these compounds are shown in Table 5 below.

TABLE 5

| Compound | $\lambda_{max}$ (nm) | (In dichloromethane) $\epsilon_{max}$ ($\times 10^4$) |
|---|---|---|
| (52) | 908 | 1.36 |
| (53) | 885 | 1.57 |
| (54) | 907 | 1.36 |
| (55) | 908 | 1.36 |

The infrared absorbent of the present invention may be used by incorporating a suitable binder. The binder may be any organic and inorganic materials capable of exhibiting an infrared absorbing property. For example, suitable materials may include polymer materials such as plastics or inorganic materials such as glass.

The binder is preferably capable of forming a film which is superior in transparency and mechanical property. Examples of such a film forming binder may include polyesters such as polyethylene terephthalate, cellulose esters such as cellulose acetate, cellulose triacetate and cellulose acetate butylate, polyolefins such as polypropylene, polyvinyl compounds such as polyvinyl chloride, polyvinylidene chloride, vinyl chloride-vinyl acetate copolymer, and polystyrene, acrylic addition polymers such as polymethyl methacrylate, polycarbonates such as polycarbonic acid ester, phenol resin, urethane resin or gelatin as a known hydrophilic binder.

As one of methods of forming a film by adding the compounds of formula [I] to the above-mentioned plastic materials or incorporating the same with the plastic materials, the compounds of formula [I] are incorporated into the plastics before preparing the film. Namely, the compounds of formula [I] are mixed with a polymer powder or pellet together with various additives, and are molten to extrude the mixture by a T-die process or a tubular film process, or the mixture is made into a film by calendering to obtain a film containing the compounds uniformly dispersed. In case of preparing the film from a polymer solution by a flow extension method, the compounds of the formula [I] may be contained in the polymer solution.

In the second method, an infrared absorbing layer may be formed by applying a polymer solution or dispersion containing the compounds of formula [I] onto a surface of various plastic films or glass plates as prepared by a suitable method. A binder polymer used for a coating liquid is selected from materials having a good solubility of the compounds of formula [I] and a superior adhesiveness to the plastic film or glass plate as a support. For example, a suitable example of these materials may include polymethyl methacrylate, cellulose acetate butylate, or polycarbonate. Optionally, a suitable undercoat may be preliminarily formed on the support film for the purpose of improving adhesiveness.

In the third method, a filter may be formed in a frame of a light window of an element to be isolated from infrared rays with the use of a polymer prepared by mixing the compounds of the formula [I] with a polymerizable monomer and adding a suitable polymerization initiator to polymerize the mixture with heat or light. In this method, the element may be entirely enclosed by plastics which may be prepared from ethylene unsaturated polymerizable monomer or an additional polymerizable composition such as epoxy resin.

In the fourth method, the compounds of formula [I] may be deposited by evaporation on a suitable support. In this method a suitable film forming binder layer as a protective layer may be formed on the deposited layer.

A method of utilizing the near-infrared absorbent of the present invention for a color solid image pick-up element is as follows:

(1) A plurality of stripe or mosaic color separation filter layers having predetermined spectral characteristics are formed, and then the near-infrared absorbent is incorporated in a surface protective layer to be formed on the filter layers, or the absorbent is deposited on the surface protective layer.

(2) The near-infrared absorbent of the present invention in combination with a visible light absorbing dyestuff may be incorporated in the color separation filter layers.

(3) The near-infrared absorbent may be incorporated in a transparent intermediate layer or a surface smooth layer provided in a multi-layer color separation filter.

An optical filter obtained by combining the infrared absorbent of the present invention with a suitable binder is especially effective when it is used in combination with color separation filters as described in Japanese Patent Application (OPI) Nos. 58107/82, 9317/84 and 30509/84.

In preparing an infrared absorbing material with use of the infrared absorbent of the present invention, two or more of the compounds represented by general formula [I] may be used in combination. Further, a known near-infrared absorbent of organic or metal complex substance may be used in combination. Particularly, when an absorbent having an absorption maximum different from that of the absorbent of the invention is used in combination, a range of absorption wavelength may be widened.

It is effective to add a ultraviolet absorbent to the infrared absorbent in the infrared absorbing material for purpose of improving a light fastness. Examples of the ultraviolet absorbent may include substituted or unsubstituted benzoates such as resorsin monobenzoate and methyl salicylate, cinnamates such as 2-oxy-3-methoxy cinnamate, benzophenones such as 2,4-dioxy-benzophenone, $\alpha,\beta$-unsaturated ketones such as 2,4-dibenzal acetone, coumarins such as 5,7-dioxy-coumarin, carbostyrils such as 1,4-dimethyl-7-oxycarbostyril, or azoles such as 2-phenyl benzoimidazole and 2-(2-hydroxyphenyl) benzotriazole.

In the case of a film prepared by a coating method in combination with the infrared aborbent of the invention and a suitable binder, a thin plastic film may be attached or coated on a surface of the coating layer for the purpose of protection or providing anti-stick quality. For example, a laminated film may be obtained by laminating a polyvinyl chloride film having a thickness of 0.05 mm on the coating layer and heat-bonding the combined films at 120°-140° C.

In preparing the optical filter material from the infrared absorbent of the present invention, 0.1-50 parts by weight, preferably 0.5-10 parts by weight of the compounds of formula [I] are contained in 100 parts by weight of the binder. An optical filter is obtained by working and treating the optical filter material so as to have a sufficient degree of transmittance in a wavelength range where infrared rays are to be cut-off. Accordingly, it is necessary to adjust a content of the compounds with respect to the binder and a thickness of the filter, so as to obtain a transmittance of 10% or less, preferably 2.0% or less, and more preferably 0.1% or less in the wavelength range of 900 nm or more at the trough of a transmittance curve. Although a practical thickness of the filter is in the range of 0.002 mm to 0.5 mm, it is possible to employ any filters having a thickness out of the above range according to application.

According to the present invention, since the infrared absorbent has a high solubility in an organic solvent, it is possible to obtain an infrared absorbing material containing the infrared absorbent which is compatibly dispersed in the binder.

Further, it is possible to obtain an infrared absorbing material which has a high cut-off ability against near-infrared rays per unit thickness, a high transmittance of visible light and a good fastness to heat and light. Accordingly, the use of the infrared absorbent of the present invention provides a very thin film having a good efficiency in infrared absorption and the film is suitable for a SPD filter.

Furthermore, since the solubility of the infrared absorbing material using the infrared absorbent of the present invention in solvent may be adjusted by suitably selecting and combining cations relative to a metal complex ion in the infrared absorbent, it is advantageously possible to widely adopt various binders.

According to the present invention, it is possible to obtain an infrared absorbing material having an absorption maximum wavelength of about 900 nm or more.

The infrared absorbent of the present invention can be applied to various uses including the afore-mentioned applications, that is, for a safelight filter for infrared sensitive materials, control of the growth of plants, cut-off of heat radiation, cut filter of infrared rays harmful to tissues of human eyes, cut filter for infrared rays of semiconductor light receiving elements or color solid image pick-up elements, and cut filter for infrared rays in an optelectronic integrated circuit, electrical and optical elements being incorporated into the same substrate.

Moreover, the infrared absorbent of the present invention is varioiusly adaptable according to its infrared absorbing characteristics. For example, when the infrared absorbent is added to a jet printer ink as described in Japanese Patent Application (OPI) No. 135568/81, the reading efficiency of near-infrared rays may be improved, and further it is applicable to a laser recording/reading medium as described in Japanese Patent Application (OPI) No. 11090/82. The infrared absorbent according to the present invention has such a property as the conversion of absorbed near-infrared rays to heat, and therefore it may be utilized as an infrared ray/heat converter. Typical examples of such an exchanger are as follows:

(1) The infrared absorbent is added to a laser heat sensitive recording material as described in Japanese Patent Application (OPI) Nos. 14095/82 and 14096/82, and an infrared laser is irradiated to the composition to generate heat, thereby enhancing a mixed coloring reaction.

(2) The infrared absorbent may be contained in a regist material as described in Japanese Patent Application (OPI) No. 40256/82 which material may change solubility by a thermal function due to a laser.

(3) The infrared absorbent may be incorporated in a thermodrying or thermosetting composition as described in Japanese Patent Application (OPI) No. 143242/81 to promote reaction.

Furthermore, the compounds of the present invention may be utilized in an electrophotosensitive film for an electrophoto printer using a semiconductor laser as a light source as described in Japanese Patent Application (OPI) No. 214162/83, and may also be utilized in an optical disc film which permits writing and reproducing by a semiconductor laser.

It should be moted that applications of the infrared absorbent of the present invention are not limited to the above description.

EXAMPLES

To further illustrate this invention, and not by way of limitation, the following examples are given.

REFERENCE EXAMPLE 1

Synthesis of exemplified compound (3)

In 600 ml of absolute ethanol, 36 g of potassium hydroxide was dissolved, and 50 g of toluene-3,4-dithiol was added to the solution, followed by the agitation at a room temperature for 10 min. Then, 36.8 g of nickel chloride hexahydrate was dissolved in 400 ml of absolute ethanol, and the solution was added to the above-obtained solution, followed by the agitation of the reaction solution at a room temperature for 30 min. To the above-obtained solution, a solution of 111 g of tetra-n-butyl phosphonium bromide in 300 ml of absolute ethanol was added at a room temperature. Then, the solution was stirred at a room temperature for 2 hours to obtain a dark green crystal as deposited. The crystal was separated by filtration and was first washed with water, then washed with ethanol to air-dry the same. This was recrystallized from hot acetone-ethanol to obtain exemplified compound (3). (yield 50 g; m.p. 162°–165° C.)

REFERENCE EXAMPLE 2

Synthesis of exemplified compound (11)

In 600 ml of absolute ethanol, 36 g of potassium hydroxide was dissolved, and 50 g of toluene-3,4-dithiol was added to the solution to stir the same at a room temperature for 10 min. Then, to the solution, a solution of 36.8 g of nickel chloride hexahydrate in 400 ml of absolute ethanol was added, and the obtained solution was stirred at a room temperature for 30 min. To the solution, a solution of 230 g of hexadecyl tributyl phosphonium bromide in 300 ml of absolute ethanol at 50° C. was added. Then, the obtained solution was stirred at a room temperature for 2 hours to obtain a dark green crystal as deposited. The crystal was separated by filtration and was first washed with water, then washed with ethanol to air-dry the same. This was recrystallized from hot ethanol to obtain exemplified compound (11). (yield 43 g; m.p. 56°–60° C.)

REFERENCE EXAMPLE 3

Synthesis of exemplified compound (15)

In 600 ml of absolute ethanol, 36 g of potassium hydroxide was dissolved, and 50 g of toluene-3,4-dithiol was added to the solution to stir the same at a room temperature for 10 min. Then, to the solution, a solution of 36.8 g of nickel chloride hexahydrate in 400 ml of absolute ethanol was added, and then the obtained solution was stirred at a room temperature for 30 min. To the solution, a solution of 127 g of benzyltributylphosphonium bromide in 360 ml of absolute ethanol was added. Then, the obtained solution was stirred at a room temperature for 2 hours to obtain a dark green crystal as deposited. The crystal was separated by filtration, and was first washed with water, then washed with ethanol to air-dry the same. This was recrystallized from hot acetone to obtain exemplified compound (15). (yield 63 g; m.p. 213°–215° C.)

REFERENCE EXAMPLE 4

Synthesis of exemplified compound (20)

In 400 ml of 95% ethanol, 21.5 g of cuprous oxide and 31.0 g of 1-butane thiol were refluxed with stirring in the atmosphere of argon. An almost colorless precipitate of butyl mercapto copper (I) was formed. The precipitate was filtered off, washed with ethanol, and dried under reduced pressure to obtain 37 g of butyl mercapto copper (I).

In a mixed solvent of 60 ml of quinoline and 20 ml of pyridine, 21 g of the above-obtained butyl mercapto copper (I) and 19 g of 4-ethoxy-1,2-dibromobenzene prepared by a normal process were dissolved, and the solution was refluxed with stirring for 3 hours. After being allowed to cool, the reaction solution was poured into a mixture of 500 g of ice and 100 ml of conc. hydrochloric acid with stirring to separate an oily substance. A supernatant was separated off by decantation. The oily substance was dissolved in ether, and Glauber's salt was added to the solution, and allowed to stand overnight. Then the solution was filtrated, and the solvent in the filtrate was distilled off to obtain 12 g of brown oily crude 4-ethoxy-1,2-bis(butylthio)benzene. 6 g of the crude product was dissolved in 80 ml of liquid ammonia, and 1.6 g of sodium of a red bean size was added to the solution little by little with stirring as cooling a reactor in a dry ice-methanol bath, and then further stirred for 30 min. Then, 10 g of ammonium chloride was added to decompose the sodium, and an ammonia was expelled with an argon gas by gradually heating the solution. Ice-water was added to residue in a flask, and the solution was kept alkaline and subjected to filtration. A hydrochloric acid was added to the filtrate, and the acidic solution was extracted with ether three times. Then, the liquid extract was collected, and Glauber's salt was added to the liquid extract and allowed to stand overnight. Then, the liquid extract was filtrated, and the solvent in the filtrate was distilled off to obtain 2.2 g of crude 4-ethoxy-1,2-dimercapto benzene.

In 20 ml of methanol, 2.0 g of the obtained 4-ethoxy-1,2-dimercapto benzene was dissolved, and 1.0 g of potassium hydroxide was added and dissolved completely. Then, to the solution, a solution of 1.2 g of nickel chloride (hexahydrate) in methanol was added, and stirred for 10 min. Then, to the solution, a solution of 4 g of tetrabutylammonium bromide in 20 ml of water was added to form a black precipitate. The solution was further stirred for 30 min, filtrated, firstly washed with water, then washed with methanol, and air-dried. The crude product was recrystallized from acetone to give the exemplified compound (20). (yield 1.3 g; m.p. 230° C.)

REFERENCE EXAMPLE 5

Synthesis of exemplified compound (43)

In a manner similar to that in Reference Example 4, butyl mercapto copper (I) was prepared. 21 g of the obtained butyl mercapto copper (I) and 22 g of 1,2-dibromo-4-amino benzene prepared by a normal process were dissolved in a mixed solvent of 60 ml of quinoline and 20 ml of pyridine, and the solution was refluxed with stirring for 3 hours. After being allowed to cool, the reactant was poured into a mixture of 500 g of ice and 100 ml of conc. hydrochloric acid with stirring to separate an oily substance. A supernatant was separated off by decantation. The oily substance was dissolved in ether, and Glauber's salt was added to the solution, and allowed to stand overnight. Then, the solution was filtrated, and the solvent in the filtrate was distilled off to obtain 13 g of brown oily 4-amino-1,2-bis(butylthio)-benzene. 7 g of the obtained crude substance was dissolved in 80 ml of liquid ammonia, and 1.6 g of sodium of a red bean size was added to the solution little by little with stirring in a reactor cooled in a dry ice-methanol bath, and then further stirred for 30 min. Then, 10 g of ammonium chloride was added to decompose the sodium, and an ammonia gas was expelled with an argon gas by gradually heating the solution. Ice-water was added to a residue in a flask, and the solution was filtrated being kept alkaline. A hydrochloric acid was added to the filtrate, and the acidic solution was extracted with ether three times. Then, the liquid extract was collected to add Glauber's salt thereto and allowed the same to stand overnight. Then, the liquid extract was filtrated, and the solvent in the filtrate was distilled off to obtain 2.7 g of crude 4-amino-1,2-dimercapto benzene. 2.2 g of the obtained 4-amino-1,2-dimercapto benzene was dissolved in 20 ml of methanol, and 1.0 g of potassium hydroxide was added to the obtained solution and dissolved completely.

Then, a solution of 1.2 g of nickel chloride (hexahydrate) in 20 ml of methanol was added to the above-obtained solution, and stirred for 10 min. Thereafter, to the solution, a solution of 5.2 g of tetrabutylphosphonium bromide in 200 ml of water was added to instantly form a black precipitate. The solution was further stirred for 30 min, filtrated, washed with water and with methanol successively, and air-dried. The substance obtained was recrystallized from acetone to give exemplified compound (43). (yield 2 g; m.p. 198° C.).

REFERENCE EXAMPLE 6

Synthesis of exemplified compound (52)

In 600 ml of absolute ethanol, 36 g of potassium hydroxide was dissolved, and 50 g of toluene-3,4-dithiol was added to the solution followed by agitation for 10 min. Then, a solution of 36.8 g of nickel chloride hexahydrate in 400 ml of methanol was added to the above-obtained solution, and the solution was further stirred at a room temperature for 30 min. To the solution, a solution of 120 g of bis(triphenylphosphine) iminium chloride in 500 ml of absolute ethanol was added at a room temperature. Thereafter, the solution was further stirred at a room temperature for 2 hours to give a dark green crystal as deposited. The crystal was separated by filtration, and washed with water and ethanol successively, and air-dried. This was recrystallized from hot acetone-ethanol to obtain exemplified compound (52). (yield 50 g; m.p. 182°-183° C.)

In synthesizing the exemplified compounds of the present invention, the bis(triphenylphosphine) iminium salt used for introduction of a cation moiety is synthesized according to R. Appel and A. Hauss's method (A. Anorg. Allgem. Chem., 311 290 (1961), but, an iminium salt available on the market may be utilized. For example, the bis(triphenylphosphine) iminium chloride used in Reference Example 6 was a compound available on the market (by Alfa Co.).

The other exemplified compounds which can be employed in the present invention were synthesized by the same process as in Reference Examples 1 to 6.

EXAMPLE 1

Three kinds of optical filters were prepared by using the exemplified compounds synthesized in Reference Examples 1 to 3. That is, each component in the following compositions (1), (2) and (3) as shown in parts by weight was mixed and stirred, and the mixture was filtrated and applied onto a metal support by a casting process to form a film. Then, the film was peeled off to give desired optical filters (1), (2) and (3). Several kinds of optical filters having thickness of dry films varied in the range of 0.05 to 0.3 mm were obtained.

| Composition (1) | |
|---|---|
| TAC (cellulose triacetate) | 170 parts |
| TPP (triphenyl phosphate) | 10 parts |
| methylene chloride | 800 parts |
| methanol | 160 parts |
| exemplified compound (3) | 2 parts |
| Composition (2) | |
| DAC (cellulose diacetate) | 170 parts |
| DEP (diethyl phthalate) | 10 parts |
| methylene chloride | 800 parts |
| methanol | 160 parts |
| exemplified compound (11) | 2 parts |
| Composition (3) | |
| PC (polycarbonate; E-2000 by Mitsubishi Gas Co.) | 170 parts |
| methylene chloride | 800 parts |
| exemplified compound (15) | 2 parts |

A spectral transmittance of the optical filters (1), (2) and (3) is shown in FIG. 1. Thickness of the filters as tested is 0.1 mm.

EXAMPLE 2

In a manner similar to that in Example 1, an optical filter of 0.19 mm thickness containing a ultraviolet absorbent was prepared. Composition used in a casting method is as follows:

| TAC (cellulose triacetate) | 170 parts |
|---|---|
| TPP (triphenyl phosphate) | 10 parts |
| methylene chloride | 800 parts |
| methanol | 160 parts |
| exemplified compound (3) | 2 parts |
| 2-(5-tert-butyl-2-hydroxyphenyl)-benzotriazole | 0.2 parts |

EXAMPLE 3

The optical filter (1) (thickness 0.05 mm) prepared in Example 1 as a ultraviolet rays cut filter was mounted to a SPD (silicon photo diode). As a result, an operational performance of a photosensor was largely improved. Further, even after a forced aging test at 50° C., an operational reliability was not varied at all.

EXAMPLE 4

The optical filter (1) of 0.19 mm thickness as prepared in Example 1 was adapted to a safelight in a workshop for manufacturing and working an infrared sensitive material. Even when the safelight was used under normal conditions for one year, absorption characteristics of the safelight was not varied at all as compared with those before use.

EXAMPLE 5

(i) Solubility

Solubility of the complex compounds represented by afore-mentioned general formula [I] to organic solvents was measured.

The compounds as tested are represented by the following formula:

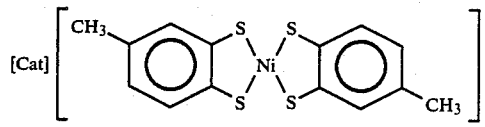

wherein, Cat stands for quaternary phosphonium as shown in even test numbers such as Test Nos. 2 and 4 in Table 6. Further, quaternary ammonium was used as the Cat for a comparative test. The test results are shown by odd test numbers such as Test Nos. 1 and 3 in Table 6.

The organic solvents were selected from acetone or methylene chloride. Solubility was measured according to the following gravimetric method: that is, 10 ml of solvent and 1 g of sample were added into a 20 ml glass test tube with a ground-glass stopper, and the test tube was shaken in a constant temperature bath (at 15° C.) for 24 hours, allowed to stand and the solution was filtrated and the solvent in the filtrate was distilled off. Then, a residue was weighed.

TABLE 6

| Test No. | Cat in complex compound | Solubility mg/acetone 10 ml | Solubility mg/CH$_2$Cl$_2$ 10 ml |
|---|---|---|---|
| 1 | (C$_2$H$_5$)$_4$N | 40 | 120 |
| 2 | (C$_2$H$_5$)$_4$P | 120 | 200 |
| 3 | ($^n$C$_4$H$_9$)$_4$N | 50 | 160 |
| 4 | ($^n$C$_4$H$_9$)$_4$P | 160 | 240 |
| 5 | ($^n$C$_4$H$_9$)$_3$(C$_6$H$_5$)N | 40 | 160 |
| 6 | ($^n$C$_4$H$_9$)$_3$(C$_6$H$_5$)P | 160 | 250 |
| 7 | ($^n$C$_8$H$_{17}$)$_4$N | 60 | 180 |
| 8 | ($^n$C$_8$H$_{17}$)$_4$P | 180 | 270 |
| 9 | ($^n$C$_8$H$_{17}$)$_3$(C$_6$H$_5$)N | 70 | 170 |
| 10 | ($^n$C$_8$H$_{17}$)$_3$(C$_6$H$_5$)P | 180 | 250 |
| 11 | ($^n$C$_{16}$H$_{33}$)($^n$C$_4$H$_9$)$_3$N | 80 | 180 |
| 12 | ($^n$C$_{16}$H$_{33}$)($^n$C$_4$H$_9$)$_3$P | 200 | 270 |
| 13 | ($^n$C$_4$H$_9$)$_3$(C$_6$H$_5$CH$_2$)N | 60 | 80 |
| 14 | ($^n$C$_4$H$_9$)$_3$(C$_6$H$_5$CH$_2$)P | 80 | 130 |

As will be apparent from the results in Table 6, the phosphonium complex of the present invention (even numbers in Test Nos.) has a higher solubility to the organic solvent than the ammonium complex (odd numbers in Test Nos.). Accordingly, in the present invention it is possible to employ concentrated infrared absorbent composition for film formation or coating. Further, the phosphonium complex of the present invention has a superior compatibility to a plastic binder to be used to form a film, thereby affording a uniform filter to be easily produced.

(ii) Heat fastness

Heat fastness was tested in regard to exemplified compound (3) and the corresponding ammonium complex, that is, the following comparative compound (A).

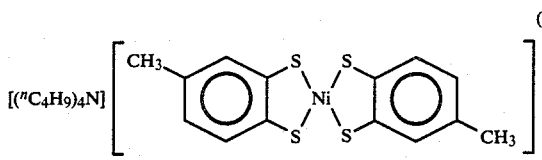

(A)

The test was carried out in the following manner: filters of 0.19 mm thickness were prepared by using both the above-mentioned compounds, in accordance with Composition (1) in Example 1, and heated at 100° C. for 24 hours to measure a change in transmittance. The test results are shown in Table 7.

TABLE 7

| Complex in filter material | Heating time (at 100° C.) | | | |
|---|---|---|---|---|
| | 0 | | 24 hours | |
| | 560 nm | 910 nm | 560 nm | 910 nm |
| Exemplified compound (3) | 80% | 0% | 77% | 2% |
| Comparative compound (A) | 80% | 0% | 63% | 14% |

As will be apparent from the results in Table 7, the phosphonium complex of the present invention maintains a cut-off ability of near infrared rays even after being subjected to light without reducing transmittance of a visible light, thus exhibiting a superior heat fastness.

(iii) Light fastness

Light fastness was tested in regard to exemplified compound (3) and the corresponding ammonium complex, comparative compound (A).

The test was carried out in the following manner, that is, filters similar to those in the heat fastness test (ii) were prepared by using the two compounds respectively, and a xenon lamp (120,000 lux) was irradiated to the filters to measure a change in transmittance (%) overtime. The test results are shown in Table 8.

TABLE 8

| Complex in filter | Irradiation time of xenon lamp (120,000 lux) | | | |
|---|---|---|---|---|
| | 0 | | 24 hrs. | |
| | 560 nm | 910 nm | 560 nm | 910 nm |
| Exemplified compound (3) | 78% | 0% | 68% | 13% |
| Comparative compound (A) | 78% | 0% | 53% | 28% |

Use of a ultraviolet absorbent in combination with the phosphonium complex of the present invention remarkably improves light resistance of the filter material. Exemplified compound (3) and 2-(5-tert-butyl-2-hydroxyphenyl)benzotriazole (compound (U)) as the ultraviolet absorbent were used in combination in a filter in the weight ratio of 10:1. Light fastness of the filter is shown in Table 9, in which a change in transmittance of the filter under the condition of irradiation of light with a time elapsed is shown.

TABLE 9

| Complex in filter | Irradiation time of xenon lamp (120,000 lux) | | | |
|---|---|---|---|---|
| | 0 | | 24 hrs. | |
| | 560 nm | 910 nm | 560 nm | 910 nm |
| Exemplified compound (3) | 78% | 0% | 68% | 13% |
| Exemplified compound (3) + Compound (U) | 80% | 0% | 78% | 2% |

As will be apparent from Table 9, when the compound of the present invention and the ultraviolet absorbent are used in combination, light resistance and fastness of the optical filter can be remarkably improved.

EXAMPLE 6

Two kinds of optical filters were prepared by using the exemplified compounds synthesized in Reference Examples 4 and 5. That is, each component in the following compositions (1) and (2) as shown in parts by weight was mixed and stirred, and the mixture was filtrated and applied onto a metal support by a casting method to form a film. Then, the film was peeled off to give desired optical filters (1) and (2). Several kinds of optical filters having thickness of dry films varied in the range of 0.05 to 0.3 mm were obtained.

| Composition (1) | |
|---|---|
| TAC (cellulose triacetate) | 170 parts |
| TPP (triphenyl phosphate) | 10 parts |
| methylene chloride | 800 parts |
| methanol | 160 parts |
| exemplified compound (20) | 2 parts |
| Composition (2) | |
| DAC (cellulose diacetate) | 170 parts |
| DEP (diethyl phthalate) | 10 parts |
| methylene chloride | 800 parts |
| methanol | 160 parts |
| exemplified compound (43) | 2 parts |

Figure 3:
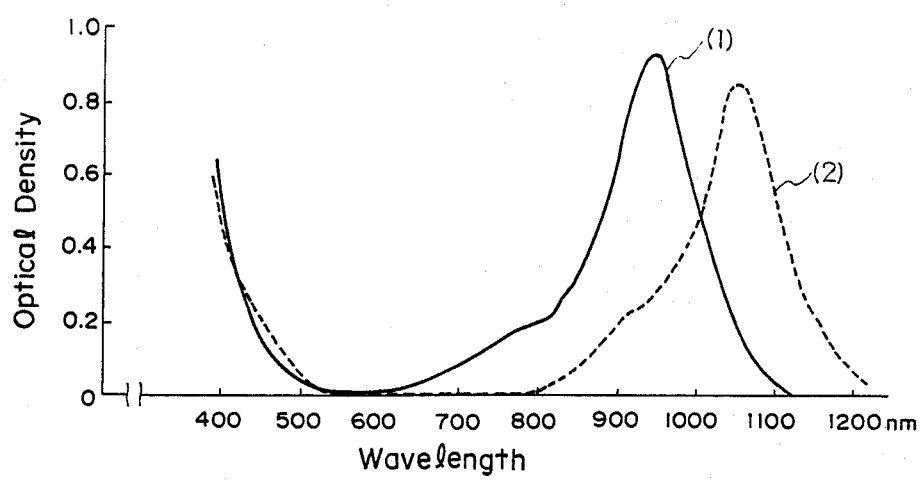
FIG. 3 is a graph of optical density curves of the optical filter obtained in Example 6.

An optical density of the optical filters (1) and (2) is shown in FIG. 3. A thickness of each of the filters as tested is 0.05 mm.

EXAMPLE 7

In a manner similar to that in Example 6, an optical filter of 0.19 mm thickness containing a ultraviolet absorbent was prepared. Composition used in a casting method is as follows:

| TAC (cellulose triacetate) | 170 parts |
|---|---|
| TPP (triphenyl phosphate) | 10 parts |
| methanol | 160 parts |
| exemplified compound (20) | 2 parts |
| 2-(5-tert-butyl-2-hydroxyphenyl)-benzotriazole | 0.2 parts |

EXAMPLE 8

The optical filter (1) (thickness 0.05 mm) prepared in Example 6 as an ultraviolet cut filter was mounted to a silicon photo diode (SPD). As a result, an operational performance of a photosensor was largely improved. Further, even after a forced aging test at 50° C., an operational reliability was not varied at all.

EXAMPLE 9

The optical filter (2) of 0.19 mm thickness as prepared in Example 6 was adapted to a safelight filter in a workshop for manufacturing and working an infrared-sensitive material. Even when the safelight filter was used under normal conditions for half a year, absorption characteristics of the safelight filter was not varied at all as compared with those before use.

Use of a ultraviolet absorbent in combination with the complex of the present invention remarkably improves light fastness of the filters. Exemplified compound (20) and 2-(5-tert-butyl-2-hydroxyphenyl)benzotriazole (compound (U)) as the ultraviolet absorbent were used in combination in the weight ratio of 10:1 in a filter. Light fastness of such filter is shown in Table 10, in which optical density of the filter under the condition of irradiation of light with a time elapsed is shown.

TABLE 10

| Complex in filter | Irradiation time of xenon lamp (120,000 lux) | |
|---|---|---|
| | 0 948 nm | 24 hrs 984 nm |
| Exemplified compound (20) | 0.92 | 0.86 |
| Exemplified compound (20) + Compound (U) | 0.92 | 0.91 |

As will be apparent from Table 10, when the compound of the present invention and the ultraviolet absorbent are used in combination, light fastness or resistance of the optical filter can be remarkably improved.

EXAMPLE 10

Two kinds of optical filters were prepared by using the exemplified compound synthesized in Reference Example 6. That is, each component in the following composition as shown in parts by weight was mixed and stirred, and the mixture was filtrated and applied onto a metal support by a casting method to form a film. Then, the film was peeled off to give the desired optical filter. Several kinds of optical filters having thickness of dry films varied in the range of 0.05 to 0.3 mm were obtained.

| Composition | |
|---|---|
| TAC (cellulose triacetate) | 170 parts |
| TPP (triphenyl phosphate) | 10 parts |
| methylene chloride | 800 parts |
| methanol | 160 parts |
| exemplified compound (52) | 2 parts |

Figure 4:
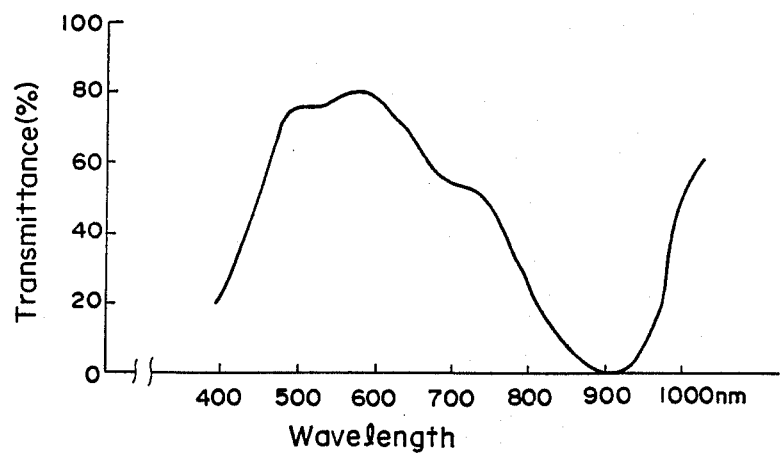
FIG. 4 is a graph of a spectral transmittance curve of the optical filter obtained in Example 10.

A spectral transmittance of the optical filter is shown in FIG. 4. A thickness of the filter as tested is 0.1 mm.

EXAMPLE 11

In a manner similar to that in Example 5, an optical filter of 0.19 mm thickness containing a ultraviolet absorbent was prepared. Composition in a casting method is as follows:

| | |
|---|---|
| TAC (cellulose triacetate) | 170 parts |
| TPP (triphenyl phosphate) | 10 parts |
| methylene chloride | 800 parts |
| methanol | 160 parts |
| exemplified compound (52) | 2 parts |
| 2-(5-tert-butyl-2-hydroxyphenyl)-benzotriazole | 0.2 parts |

(i) Heat fastness test

Heat fastness was tested in regard to compound (52) and the corresponding ammonium complex, the following comparative compound (A):

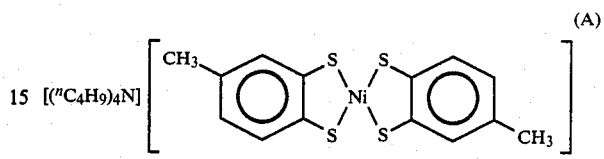

The test was carried out in the following manner, that is, filters of 0.19 mm thickness were prepared respectively by using the above-mentioned compounds by a similar composition as in Example 10, and heated at 100° C. for 24 hours to measure a change in transmittance. The test results are shown in Table 11.

TABLE 11

| Complex in filter | Heating time at 100° C. | | | |
|---|---|---|---|---|
| | 0 | | 24 hrs | |
| | 560 nm | 910 nm | 560 nm | 910 nm |
| Exemplified compound (52) | 80% | 0% | 78% | 3% |
| Comparative compound (A) | 80% | 0% | 64% | 14% |

As will be apparent from the results in Table 11, the iminium complex of the present invention maintains a cut-off ability of near infrared rays even after being subjected to light without reducing transmittance of visible light, thus exhibiting a superior heat fastness.

(ii) Light fastness test

Light fastness was tested in regard to exemplified compound (52) and the corresponding ammonium complex, comparative compound (A) used in heat fastness test.

The test was carried out in the following manner, that is, filters similar to those in heat fastness test (i) were prepared respectively by using both the compounds, and a xenon lamp (120,000 lux) was irradiated to the filters to measure a change in transmittance (%) with a time elapsed. The test results are shown in Table 12.

TABLE 12

| Complex in filter | Irradiation time of xenon lamp (120,000 lux) | | | |
|---|---|---|---|---|
| | 0 | | 24 hrs. | |
| | 560 nm | 908 nm | 560 nm | 908 nm |
| Exemplified compound (52) | 78% | 0% | 63% | 13% |
| Comparative compound (A) | 78% | 0% | 54% | 29% |

Use of a ultraviolet absorbent in combination with the phosphonium complex of the present invention remarkably improves light fastness of the filter. In the case that exemplified compound (52) and 2-(5-tert-butyl-2-hydroxyphenyl)benzotriazole (compound (U)) as the ultraviolet absorbent were used in combination in the weight ratio of 10:1, light fastness of such a filter material is shown in Table 13, in which a change in transmittance of the filter under the condition of irradiation of light with a time elapsed is shown.

TABLE 13

| Complex in filter | Irradiation time of xenon lamp (120,000 lux) | | | |
|---|---|---|---|---|
| | 0 | | 24 hrs. | |
| | 560 nm | 908 nm | 560 nm | 908 nm |
| Exemplified compound (52) | 78% | 0% | 63% | 13% |
| Exemplified compound (52) + Compound (U) | 80% | 0% | 78% | 2% |

As will be apparent from Table 13, when the compound of the present invention and the ultraviolet absorbent are used in combination, light resistance and fastness of the optical filter can be remarkably improved.

Having described a specific embodiment of our invention, it is believed that any modification or variation of our invention is within the scope of the present invention in view of the above teachings.

What we claim is:

1. A compound having the formula:

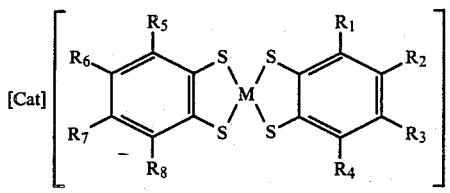

wherein:
M represents copper, cobalt, nickel, palladium or platinum; cat represents a cation to neutralize a complex; $R_1$ to $R_8$ each independently represents a member selected from the group consisting of a hydrogen atom, alkoxy group, amino group, halogen atom, cyano group, hydroxyl group, alkyl group, aryl group and heterocyclic group, said heterocyclic group being a 5-membered or a 6-membered ring containing at least one nitrogen, oxygen or sulfur atom as a hetero atom therein, said alkyl, aryl or heterocyclic group optionally being bonded through a divalent connecting group, which may be the same or different, to a benzene ring with the proviso that at least one of said $R_1$ to $R_8$ is an electron donating group when said Cat is a cation other than a quaternary phosphonium or iminium cation.

2. The compound of claim 1, wherein $R_1$ to $R_8$ each independently represents a hydrogen atom, halogen atom, cyano group, hydroxyl group, an alkyl group, aryl group or heterocyclic group.

3. The compound of claim 2, wherein Cat represents a quaternary phosphonium or iminium cation.

4. The compound of claim 1, wherein $R_1$ to $R_8$ each independently represents a hydrogen atom, halogen atom, cyano group, hydroxyl group, alkoxy group, aryl group or heterocyclic group.

5. The compound of claim 4, wherein Cat is a quaternary phosphonium or iminium cation.

6. The compound of claim 1, wherein Cat represents a quaternary ammonium cation, and $R_1$ to $R_8$ each independently represents a hydrogen atom, halogen atom, cyano group, hydroxyl group, an alkyl group, aryl group or heterocyclic group.

7. The compound of claim 1, wherein M is a nickel, and Cat is a quaternary ammonium cation, and $R_1$ to $R_8$ each independently represents a hydrogen atom, halogen atom, cyano group, hydroxyl group, an alkyl group, aryl group or heterocyclic group.

8. The compound of claim 1, wherein Cat is a monovalent inorganic cation or onium ion.

9. The compound of claim 1, wherein Cat is an onium ion.

10. The compound of claim 1, wherein Cat is a quaternary phosphonium or iminium cation.

11. The compound of claim 1, wherein Cat is a quaternary phosphonium cation, and $R_1$ to $R_8$ each independently represents a hydrogen atom, a halogen atom, or an alkyl group.

12. The compound of claim 1, wherein M is selected from the group consisting of nickel, palladium and platinum.

13. The compound of claim 1, wherein M is palladium or platinum.

14. The compound of claim 1, wherein said electron donating group has a negative sigma value of Hammet's rule, the absolute value of said sigma value being 0.20 or more.

15. The compound of claim 14, wherein M is selected from the group consisting of nickel, palladium and platinum.

16. The compound of claim 15, wherein M is palladium or platinum.

17. The compound of claim 1, wherein said electron donating group is selected from the group consisting of an alkoxy group containing 1 to 20 carbon atoms, an aryloxy group containing 6 to 14 carbon atoms, and an amino group.

18. The compound of claim 17, wherein M is palladium or platinum.

19. The compound of claim 1, wherein Cat is an iminium cation, and $R_1$ to $R_8$ are selected from the group consisting of a hydrogen atom, a halogen atom, a cyano group, and an alkyl group.

20. The compound of claim 1, wherein said alkyl group contains 1 to 20 carbon atoms.

21. The compound of claim 1, wherein said aryl group contains 6 to 14 carbon atoms.

22. The compound of claim 1, which absorbs infrared rays are at about 900 nm.

23. An infrared absorbing composition comprising an effective amount of at least one compound having the formula:

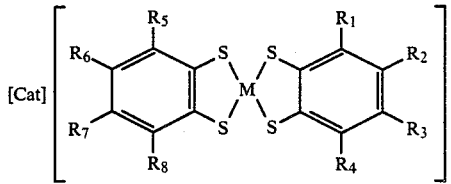

wherein:
M represents copper, cobalt, nickel palladium or platinum; Cat represents a cation to neutralize a complex;

$R_1$ to $R_8$ each independently represents a member selected from the group consisting of a hydrogen atom, alkoxy group, amino group, halogen atom, cyano group, hydroxyl group, alkyl group, aryl group and heterocyclic group, said heterocyclic group being a 5-membered or a 6-membered ring containing at least one nitrogen, oxygen or sulfur atom as a hetero atom therein, said alkyl, aryl or heterocyclic group optionally being bonded through a divalent connecting group, which may be the same or different, to a benzine ring, with the proviso that at least one of said $R_1$ to $R_8$ is an electron donating group when said Cat is a cation other than a quaternary phosphonium or iminium cation; and a binder.

24. The infrared absorbing composition as in claim 23, wherein $R_1$ to $R_8$ each independently represents a hydrogen atom, halogen atom, cyano group, hydroxyl group, alkoxy group, an aryl group or heterocyclic group.

25. The infrared absorbing composition as in claim 23, wherein Cat represents a quaternary ammonium cation, and $R_1$ to $R_8$ each independently represents a hydrogen atom, halogen atom, cyano group, hydroxyl group, an alkyl group, aryl group or heterocyclic group.

26. The infrared absorbent composition as in claim 23, wherein Cat is a quaternary phosphonium or iminium cation.

27. The infrared absorbent composition as in claim 23, wherein M is selected from the group consisting of nickel, palladium and platinum.

28. The infrared absorbing composition as in claim 23, wherein said alkyl group contains 1 to 20 carbon atoms.

29. The infrared absorbing composition as in claim 23, wherein said aryl group contains 6 to 14 carbon atoms.

30. The infrared absorbing composition as in claim 23, which absorbs infrared rays at about 900 nm.

* * * * *